US006571949B2

(12) United States Patent
Burrus, IV et al.

(10) Patent No.: US 6,571,949 B2
(45) Date of Patent: Jun. 3, 2003

(54) POWER TOOLBOX

(75) Inventors: Philip H. Burrus, IV, Lilburn, GA (US); Holley McBroom, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/587,407

(22) Filed: Jun. 5, 2000

(65) Prior Publication Data

US 2002/0008044 A1 Jan. 24, 2002

(51) Int. Cl.[7] .......................... B65D 85/28; B60R 7/00; B60R 11/06
(52) U.S. Cl. ...................... 206/373; 224/404; 296/37.1
(58) Field of Search ................ 206/349, 372, 206/373; 211/70.6; 224/403, 404, 406; 296/37.6, 100.1, 100.02, 100.18, 37.1, 24.1

(56) References Cited

U.S. PATENT DOCUMENTS

| | | | | |
|---|---|---|---|---|
| 3,371,975 A | * | 3/1968 | Meltzer | 206/349 |
| 4,136,904 A | * | 1/1979 | Lauderdale | 296/37.1 |
| 4,488,669 A | * | 12/1984 | Waters | 224/404 |
| 4,703,852 A | | 11/1987 | Verdier | |
| 4,768,652 A | | 9/1988 | Fallon | |
| 4,917,239 A | * | 4/1990 | Smith | 206/349 |
| 4,927,021 A | | 5/1990 | Taylor | |
| 5,339,956 A | * | 8/1994 | Thomason | 206/372 |
| 5,533,843 A | * | 7/1996 | Chung | 206/349 |
| 5,917,694 A | * | 6/1999 | Denny | 206/372 |

* cited by examiner

Primary Examiner—Bryon P. Gehman
(74) Attorney, Agent, or Firm—Philip H. Burrus, IV (57) ABSTRACT

This invention is a "power" toolbox for vehicles that charges power tools and batteries while the vehicle is driven. A preferred embodiment is intended to be placed in a pick-up truck bed. The toolbox is coupled to the vehicular automotive system, and electrical power is delivered through electrical contacts in the toolbox to modular compartments that hold power tools or batteries in a nested fashion. When the vehicle is running, any battery or tool coupled to a compartment is charged. The compartments may be of different shapes and sizes and may include electrical circuitry to modulate the voltage and current from the vehicular electrical system. An optional manual switch is provided to disengage the toolbox from the vehicular electrical system.

17 Claims, 6 Drawing Sheets

POWER TOOLBOX

TECHNICAL FIELD

This invention relates generally to toolboxes, and more specifically to toolboxes designed for automotive vehicles.

BACKGROUND

Power tools are all the rage today for people who build things. The popularity of power tools comes from the time and physical effort that they save. For example, not too long ago, people used a brace and bit to drill a hole. The brace and bit required a worker to turn the bit in a circular motion by hand. Today, power drills bore holes in a manner than is both faster and less tiring. Similar accolades can be said for power screwdrivers.

Power tools are especially popular with people who work in the construction industry. For people building houses, tools are often used continuously during the day. A power drill or nail gun can save hundreds of hours and countless muscle aches in any given year. The main complaint that construction professionals have with power tools, however, is battery capacity. Nothing is more frustrating than getting positioned on top of a 50-story high rise only to find that the battery in your screwdriver is dead.

As batteries for power tools are typically large, nickel-cadmium (NiCd) batteries, they typically take several hours to charge. Typical prior art battery chargers connect a wall outlet to the tool with some form of power conversion. A primary drawback to these chargers is that a power tool user must have access to a conventional power grid. If he is working in a remote location, this may not be possible. A construction professional may lose valuable compensation if his work is delayed due to battery recharging.

Other prior art charging systems include cigarette lighter adapters, where a tool can be connected to an automotive cigarette lighter adapter. The problem with these systems is that most professionals have multiple power tools while most production vehicles have only one cigarette lighter. With the crackdown on tobacco, some vehicles now come with no cigarette lighter. Another problem is that many tools with many cables can become tangled and unwieldy.

There is thus a need for a better charging system.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention is a "power toolbox" for vehicular applications. "Non-power" toolboxes for pickup trucks are commonly available and often seen. These boxes are mounted in the bed of the truck next to the cab. The boxes are designed to be permanent fixtures in the bed of the truck, with a lock and key to keep them sealed. They are typically made of stainless steel or other metal material.

This invention is a special version of such a toolbox that incorporates compartments for tools and optional charging circuitry that is connected to the vehicle's electrical system. The toolbox has at least one electrical interconnects which couples the vehicular electrical system to the compartment.

The compartments are modular "encasements" provided to fit both batteries and the tool with a battery connected in a nested fashion. For example, in a preferred embodiment a drill compartment is a modular insert that connects to the electrical connectors in the toolbox and has a recess located within that is a negative image of half the drill. To use the invention, the user simply inserts the drill into the negative image and shuts the lid. When the vehicle is moving, the charger, running from the vehicular electrical system, charges the battery.

The modular sections allow different tool compartments to be interchangeable within the toolbox. Thus, the toolbox becomes a variable and customizable charging system that runs whenever the vehicle is being driven. Alternatively, a manual power switch may be provided to electrically disconnect the toolbox to discontinue charging. As most power tool batteries are NiCd, the charger can be less sophisticated, thereby saving cost. In other words, while lithium based batteries require precision component for accurate charge termination, for NiCd, a simple step-down or "buck" regulator is all that is required.

Figure 1:
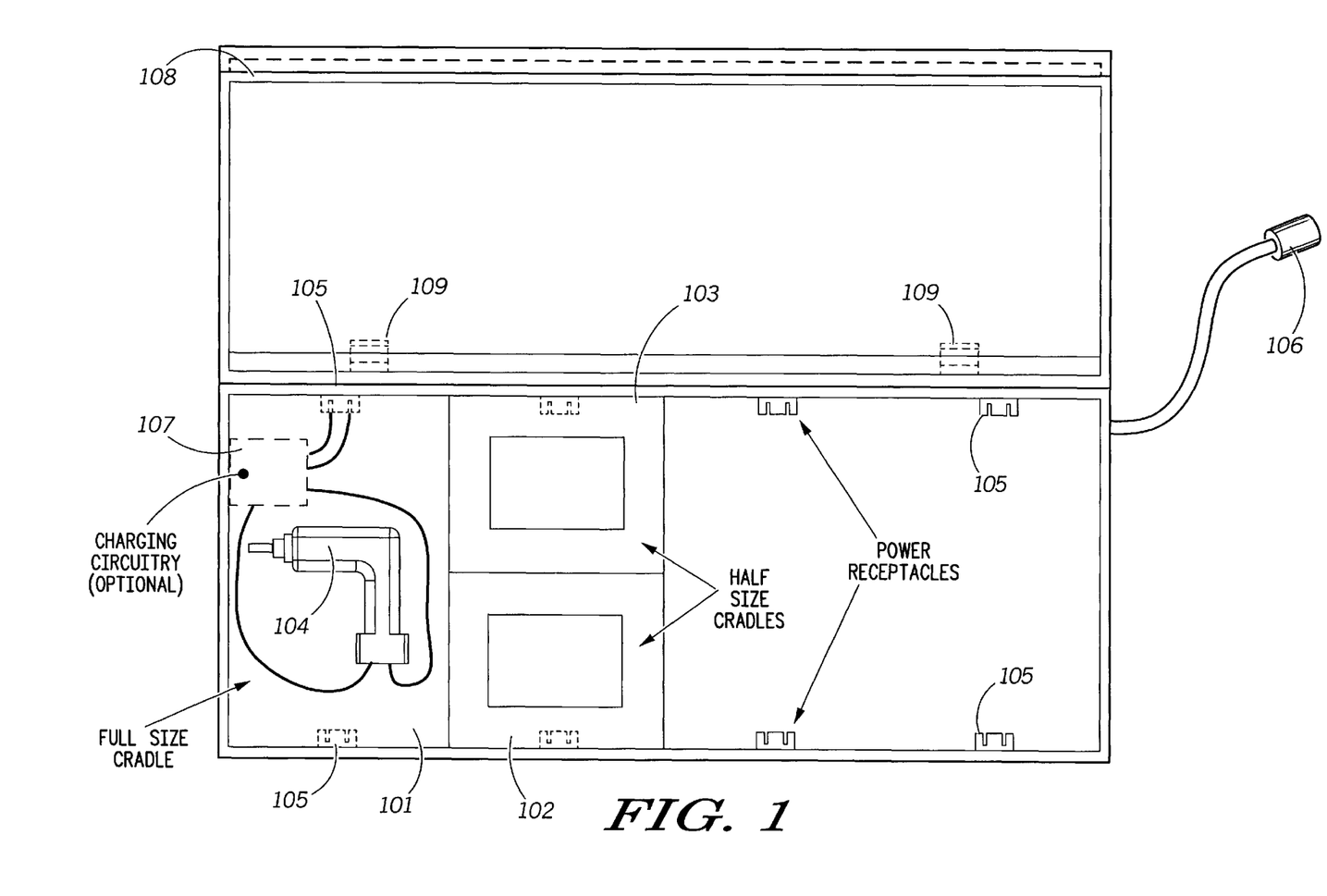
FIG. 1 is a top view preferred embodiment of a toolbox in accordance with the invention.

Referring now to FIG. 1, a preferred embodiment of the invention is shown. FIG. 1 is a top view showing the power toolbox 100 with three compartments 101, 102, 103 connected therein. The compartments can generally be the same, in the case where several units of the same tool needed to be held, or dissimilar to accompany different tools. For example, the first compartment 101 shown is larger that the second compartment 102 and the third compartment 103. The first compartment is illustrated a holding a drill 104 for exemplary purposes. Similarly, the second compartment 102 and the third compartment 103 might hold a screwdriver and additional rechargeable batteries.

In this embodiment, the first compartment 101 is electrically coupled to the power toolbox 100 through an electrical connector 105. The electrical connector 105 provides power from the electrical terminal which is coupled to the automotive electrical system. In a preferred embodiment, electrical power is delivered from the electrical connector 105 to charging circuitry 107 disposed within the compartment 101.

The charging circuitry 107 modulates the current and voltage to produce electrical power amenable to charging a rechargeable cell. For example, while the automotive electrical system may generate 12V DC, a rechargeable battery cell may require 5V DC with a 3 A current limit. The electrical circuitry 107 would so modulate the incoming power and deliver it to the rechargeable cell. Note that some power tools include self-contained charging circuitry. Thus, in another embodiment, the compartment 101 would not include charging circuitry. It would rather deliver power directly to the tool 104.

It is contemplated that a professional may indeed have several batteries for a single tool. For instance, a carpenter may have a saw that is used continuously throughout the day. She may desire to have more than on battery. To accommodate such a professional, another embodiment includes compartments that are designed exclusively for rechargeable batteries without a host device. Such compartments would typically include charging circuitry.

The embodiment shown in FIG. 1 also includes a lid 108 that opens with a hinge motion as the lid rotates on hinges 109. The lid prevents weather from damaging the electrical contacts 105 and the power tools 104. Additionally, the lid 108 may include a lock to prevent theft.

Figure 2:
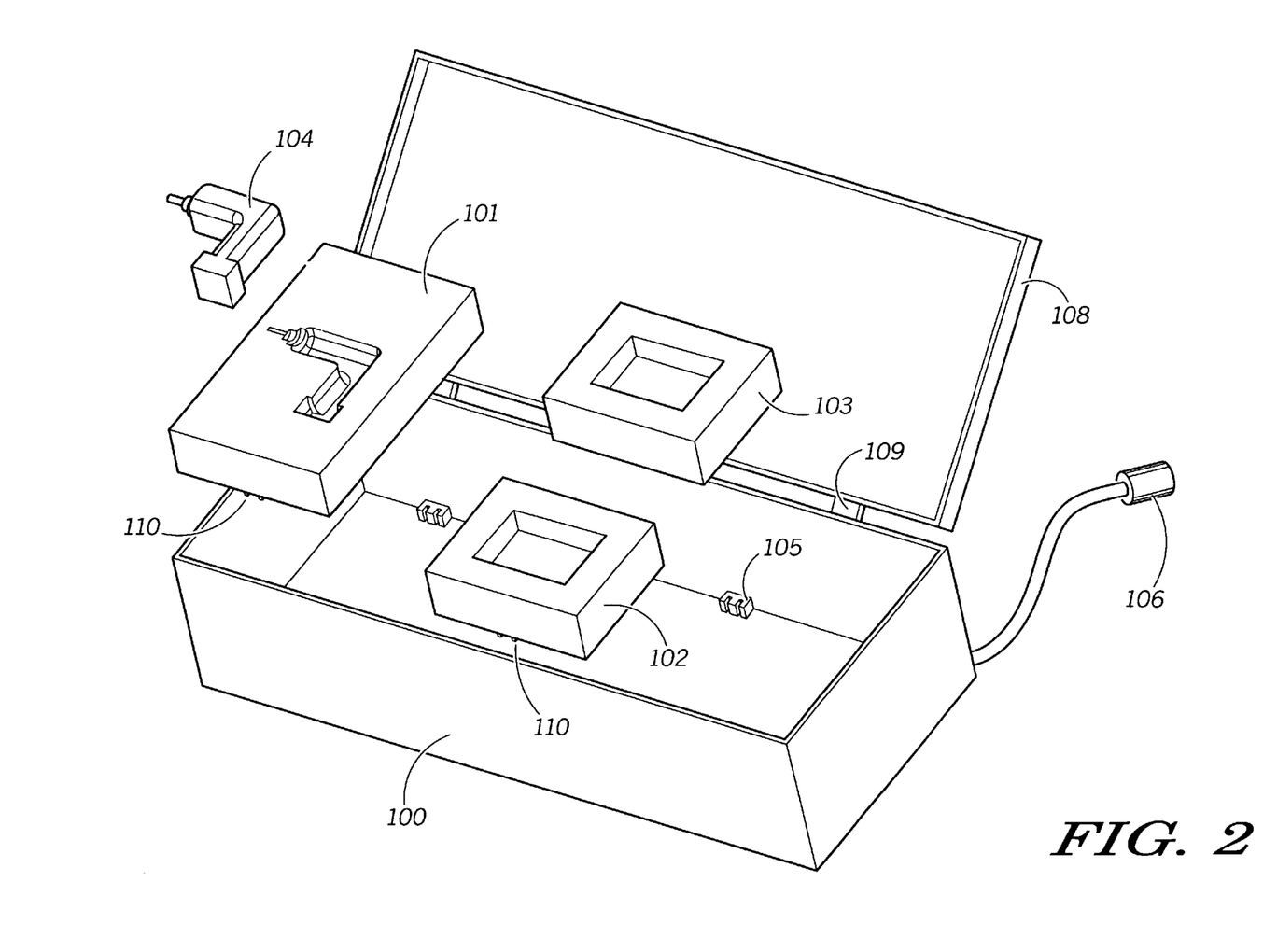
FIG. 2 is an isometric, exploded view of a toolbox in accordance with the invention.

Referring now to FIG. 2, an exploded view of a preferred embodiment is illustrated therein. Note that the compartments 101,102,103 can be either fixed or removable as shown. The compartments 101,102 have electrical connectors 110 that couple the compartments 101,102 to the electrical contacts 105. Notice that the compartments 101, 102,103 are shallower than the toolbox 100 itself. It is contemplated that any number of combinations of compartments could be included in any one box. The combinations may include stacking vertically or horizontally. Additionally, as not all tools are power tools, another embodiment may include "dummy" compartments that have no electrical coupling. These compartments may hold tools, such as hammers, or other implements, such as nails.

A preferred embodiment includes means for mechanically coupling the power toolbox 100 to a vehicle. The mechanical coupling means includes, but is not limited to, braces, buckles, bolts, screws, harnesses, straps, magnets and Velcro. The invention is best suited for a pick-up truck bed, but is not so limited. It is also well suited for automotive trunks or portable toolbox designs.

Figure 3:
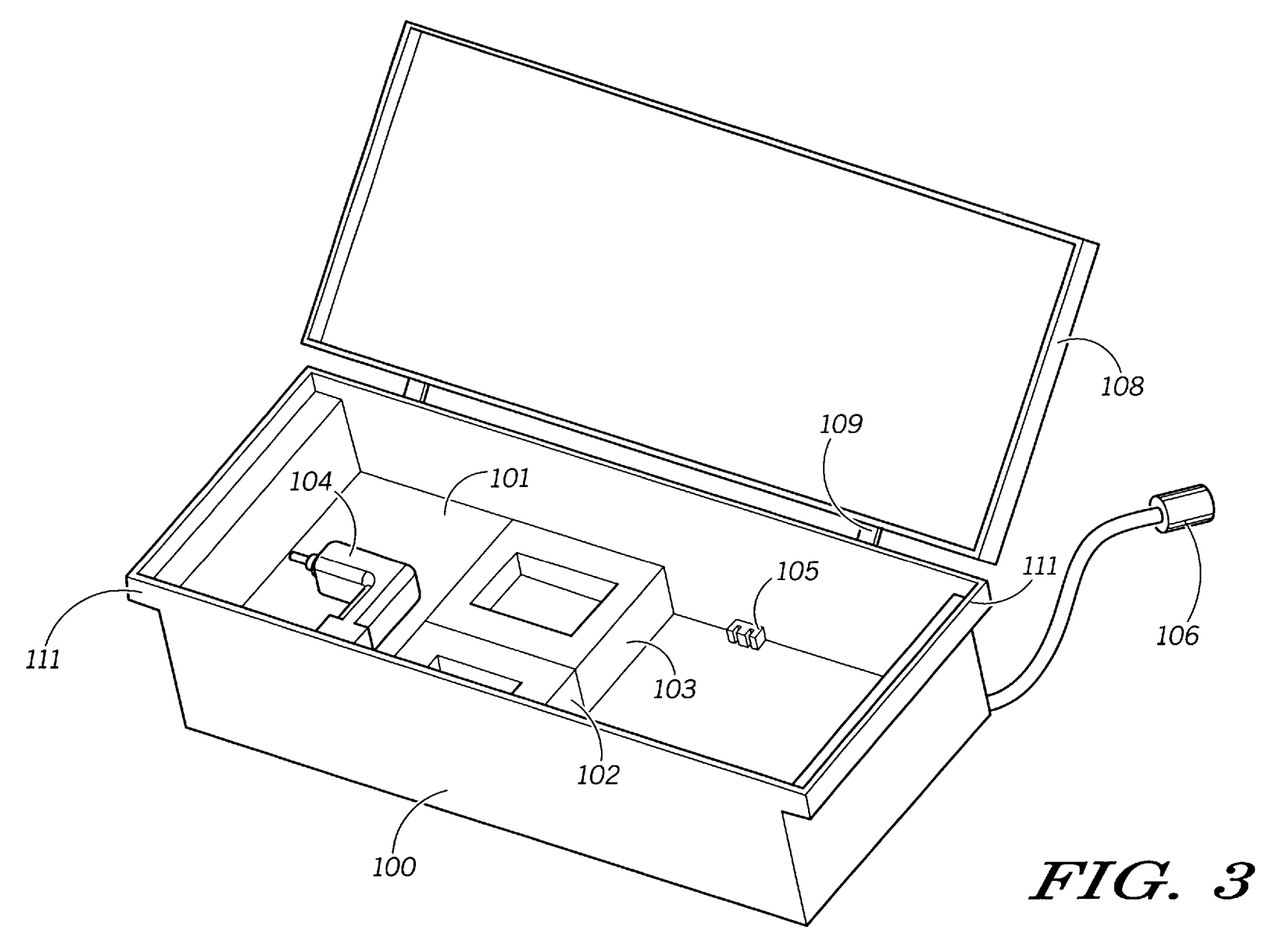
FIG. 3 is an isometric, exploded view of an alternate embodiment of the invention.

Referring now to FIG. 3, another embodiment of the invention is illustrated therein. In this embodiment, the power toolbox includes flanges 111 which are designed to overlap the vertical walls of a pick-up truck bed. The flanges 111 have numerous benefits: First, they increase the interior volume of the toolbox 100. Second, they provide additional means for coupling the box to the vehicle. Third, they provide an easy opening lid 112, as the user does not have to reach as far horizontally across the bed. Fourth, they provide aesthetic advantages, as the visual lines of the truck bed are uninterrupted by the edges of the toolbox.

Figure 4:
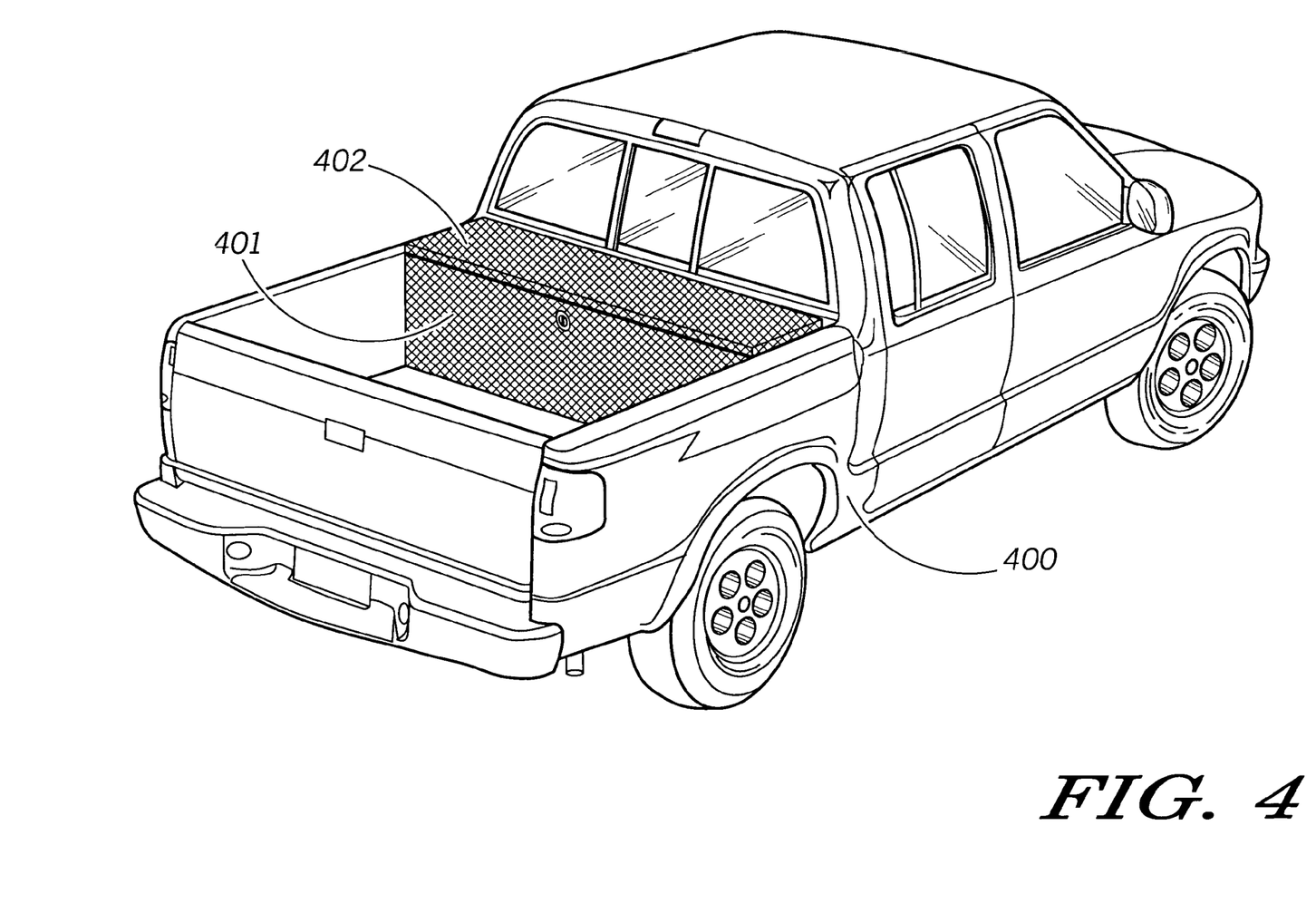
FIG. 4 is a view of a preferred embodiment of the invention coupled to a vehicle.
Figure 5:
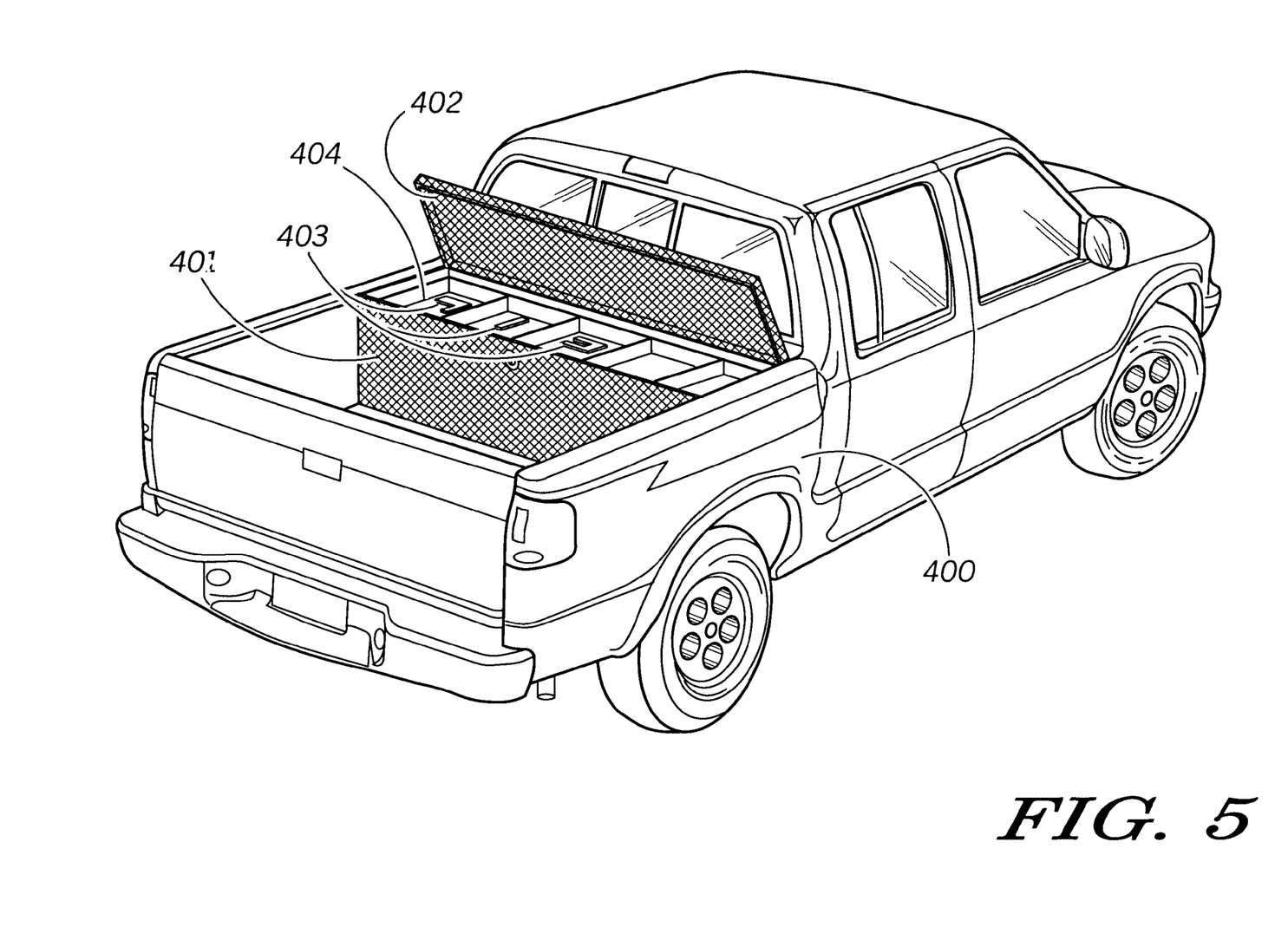
FIG. 5 is a view of a preferred embodiment of the invention with the lid open coupled to a vehicle.

Referring now to FIG. 4, illustrated therein is a preferred embodiment of a power toolbox 401 in accordance with the invention coupled to a pick-up truck 400. The lid 402 opens in a hinged motion to allow access to the tools disposed within. FIG. 5 illustrates the toolbox 401 with the lid 402 open. The tools 403 are shown nested in compartments 404 which are stacked within the toolbox 401 as previously recited.

Figure 6:
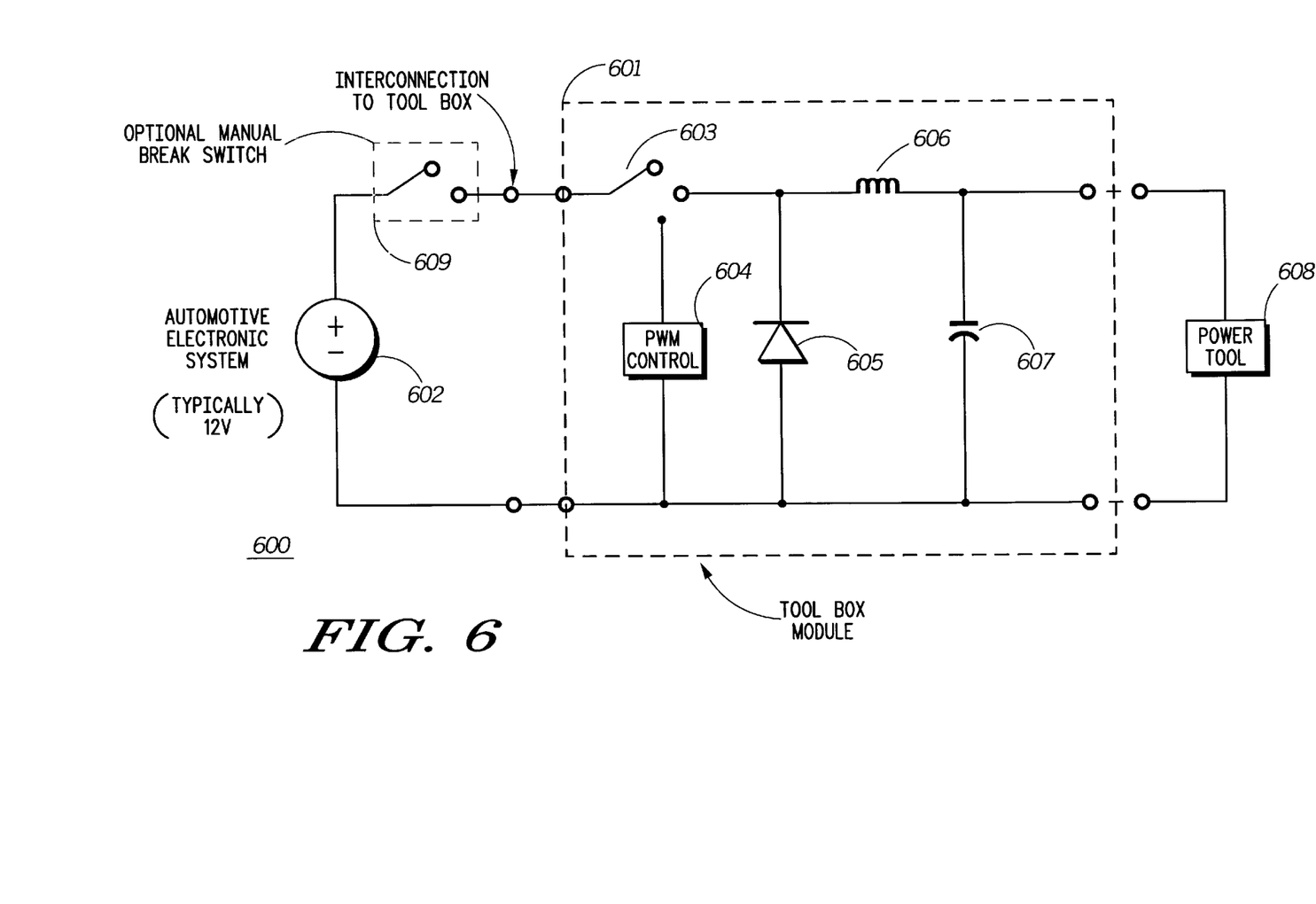
FIG. 6 is a schematic diagram of a preferred embodiment of a power conversion circuit in accordance with the invention.

As mentioned, the toolbox is coupled to the automotive electrical system. The compartments may include circuitry for modulating the voltage in current. FIG. 6 illustrates one such circuit 600. This circuit 600 is known as a step-down, or "buck", regulator. As the voltage of an automotive electrical system is typically 12V DC, the voltage is too high for charging a normal NiCd battery. Generally speaking, the termination voltage of such batteries is around 6V. Thus, unless a host device, like a drill or saw, has an internal charger, circuitry is required to step down the voltage.

The buck regulator 600 is well known in the art, but a brief description is warranted here. Broadly speaking, the automotive electrical system 602 comprises the engine, battery, alternator and associated wiring. This is coupled to the toolbox through the electric terminal (106 FIG. 1). The electrical system 602 supplies approximately 12V DC.

The toolbox module 601 comprises a switch 603, a pulse width modulation (PWM) control unit 604, a freewheel diode 605, a series inductor 606 and a filter capacitor 607. PWM controllers 604 are found commonly in the market. One such example is the TL494 PWM Integrated Circuit manufactured by On-Semiconductor. The PWM 604 opens and closes the switch 603 at a duty cycle that varies with the load. This actuation of the switch 603 causes the freewheel diode 605 to conduct intermittently, allowing current to flow through the inductor 606 and capacitor 607. The output is a filtered, stepped-down, switched DC output to the load, which may comprise either a power tool 608 or a stand alone rechargeable battery cell.

The invention is intended to be used per the following method: The user mechanically couples the toolbox to the vehicle, coupling the electrical terminal to the automotive electrical system (this is a one time operation). The user then equips the toolbox with the proper compartments to accommodate his tools. These compartments may include electrically coupled compartments with electrical circuitry modules, electrically coupled compartments without circuitry modules, and non-electrically coupled modules for non-power tools, nails, screws and the like.

Next, the user nests the tools in the proper compartments. As the toolbox is coupled to the automotive electrical system continuously, whenever the vehicle is running, any tools nested in electrical compartments are being charged. Thus, the professional is constantly charging his tools while driving to and from the job site.

Referring again to FIG. 6, an optional manual break switch 609 is also provided. As some users may not desire to constantly charge their tools, the manual break switch 609 provides a means to deactivate the toolbox when the engine is running. If the manual break switch 609 is installed, the vehicle must be running and the manual break switch 609 must be in the "on" position for power tools and batteries to charge.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment is described for a pick-up truck bed, it is clear that the size and shape could be easily modified to accommodate a car, mini-van, sport utility vehicle, or portable toolbox.

What is claimed is:

1. A toolbox, comprising:
   a. a bottom section having a bottom, a front wall, side walls arid a back wall, the walls extending generally perpendicular to the bottom;
   b. a lid coupled to the bottom section, wherein the lid opens in a hinging manner with respect to the bottom;
   c. at least one electrical terminal which can be perdurably coupled to an automotive electrical system;
   d. at least one detachable compartment for storing at least one power tool having a rechargeable battery cell, the at least one detachable compartment having located therein a first electrical connector which can be coupled to the at least one electrical terminal and a second electrical connector which can be coupled to the at least one power tool; and e. means for mechanically perdurably coupling the toolbox to a vehicle;

wherein the at least one compartment is capable of charging a rechargeable battery cell of a power tool.

2. The toolbox of claim 1, wherein the at least one compartment is shaped to retain the at least one power tool, the at least one power tool being enclosed in the at least one compartment in a nested relationship.

3. The toolbox of claim 2, further comprising electrical circuitry for modulating power from the automotive electrical system.

4. The toolbox of claim 3, wherein multiple said compartments are dissimilar so as to accommodate different tools.

5. The toolbox of claim 3, wherein the vehicle is a pick-up truck.

6. The toolbox of claim 5, wherein the toolbox couples to the bed of the pick-up truck.

7. The toolbox of claim 6, wherein the compartments are removable from the toolbox.

8. The toolbox of claim 7, further comprising two winged portions which overlap the walls of the bed of the pick-up truck.

9. The toolbox of claim 8, wherein the electrical circuitry comprises a step-down regulator.

10. The toolbox of claim 9, wherein the electrical circuitry further comprises a manual power switch.

11. The toolbox of claim 10, wherein the electrical circuitry further comprises a liner regulator.

12. A toolbox, comprising:

a. a bottom section having a bottom, a front wall, side walls arid a back wall, the walls extending generally perpendicular to the bottom;

b. a lid coupled to the bottom section, wherein the lid opens in a hinging manner with respect to the bottom;

c. at least one electrical terminal which can be perdurably coupled to an automotive electrical system;

d. at least one detachable compartment for storing at least one power tool having a rechargeable battery cell, the at least one detachable compartment having located therein a first electrical connector which can be coupled to the at least one electrical terminal and a second electrical connector which can be coupled to the at least one power tool, the at least one detachable compartment comprising at least one pocket for accommodating the at least one power tool; and e. means for mechanically perdurably coupling the toolbox to a vehicle;

wherein the at least one compartment is capable of charging a rechargeable battery cell of a power tool.

13. A toolbox for a pick-up truck bed, comprising:

a. a bottom section having a bottom, a front wall, side walls arid a back wall, the walls extending generally perpendicular to the bottom;

b. a lid coupled to the bottom section, wherein the lid opens in a hinging manner with respect to the bottom;

c. at least one electrical terminal which can be coupled to an automotive electrical system;

d. at least one detachable compartment for storing at least one rechargeable battery cell, the at least one detachable compartment having located therein a first electrical connector which can be coupled to the at least one electrical terminal and a second electrical connector which can be coupled to the at least one battery cell; and e. means for mechanically coupling the toolbox to a pick-up truck bed;

wherein the at least one compartment is capable of charging a rechargeable battery cell of a power tool.

14. A method for charging power tools, the method comprising the steps of:

a. placing a power tool in a detachable compartment having located therein at least one electrical connection;

b. electrically coupling the compartment to a tool box;

c. perdurably electrically coupling the tool box to a vehicular power source; and perdurably mechanically coupling the tool box to a vehicle.

15. The method of claim 14, further comprising the step of starting the vehicle to apply energy from the vehicular power source.

16. The method of claim 15, further comprising the step of actuating a switch to apply energy from the vehicular power source.

17. A toolbox, comprising:

a. a bottom section having a bottom, a front wall, side walls and a back wall, the walls extending generally perpendicular to the bottom;

b. a lid coupled to the bottom section, wherein the lid opens in a hinging manner with respect to the bottom;

c. at least one electrical terminal which can be perdurably coupled to an automotive electrical system;

d. at least one detachable compartment for storing at least one power tool having a rechargeable battery cell, the at least one detachable compartment having a first electrical connector which can be coupled to the at least one electrical terminal and a second electrical connector which can be coupled to the at least one power tool, the at least one detachable compartment comprising at least one pocket for accommodating the at least one power tool; and e. means for mechanically perdurably coupling the toolbox to a vehicle;

wherein the at least one compartment is capable of charging a rechargeable battery cell of a power tool.

\* \* \* \* \*

UNITED STATES PATENT AND TRADEMARK OFFICE
CERTIFICATE OF CORRECTION

PATENT NO. : 6,571,949 B2 Page 1 of 1
DATED : February 2, 2004
INVENTOR(S) : Philip H. Burrus IV and Holley McBroom

It is certified that error appears in the above-identified patent and that said Letters Patent is hereby corrected as shown below:

<u>Column 4,</u>
Line 57, "arid" should be -- and --.

<u>Column 5,</u>
Lines 35 and 56, "arid" should be -- and --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,571,949 B2
DATED         : June 3, 2003
INVENTOR(S)   : Philip H. Burrus IV and Holley McBroom It is certified that error appears in the above-identified patent and that said Letters Patent is hereby corrected as shown below:

<u>Column 4,</u>
Line 57, "arid" should be -- and --.

<u>Column 5,</u>
Lines 35 and 56, "arid" should be -- and --.

This certificate supersedes Certificate of Correction issued April 13, 2004.

Signed and Sealed this

Twenty-fifth Day of May, 2004

JON W. DUDAS
*Acting Director of the United States Patent and Trademark Office*